US012640853B2

(12) United States Patent
Liang et al.

(10) Patent No.: US 12,640,853 B2
(45) Date of Patent: May 26, 2026

(54) DISCONTINUOUS RECEPTION CONTROL METHOD AND APPARATUS, TERMINAL, AND READABLE STORAGE MEDIUM

(71) Applicant: VIVO MOBILE COMMUNICATION CO., LTD., Guangdong (CN)

(72) Inventors: Jing Liang, Guangdong (CN); Xiaodong Yang, Guangdong (CN); Jiamin Liu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 376 days.

(21) Appl. No.: 18/179,637

(22) Filed: Mar. 7, 2023

(65) Prior Publication Data

US 2023/0208563 A1     Jun. 29, 2023

Related U.S. Application Data

(63) Continuation of application No. PCT/CN2021/118466, filed on Sep. 15, 2021.

(30) Foreign Application Priority Data

Sep. 21, 2020    (CN) .......................... 202010997202.3

(51) Int. Cl.
H04L 1/1829 (2023.01)
H04W 72/25 (2023.01)
H04W 76/28 (2018.01)

(52) U.S. Cl.
CPC .......... H04L 1/1848 (2013.01); H04L 1/1861 (2013.01); H04W 72/25 (2023.01); H04W 76/28 (2018.02)

(58) Field of Classification Search
None
See application file for complete search history.

(56) References Cited

U.S. PATENT DOCUMENTS

2020/0106566 A1* 4/2020 Yeo ........................ H04L 1/1812
2020/0275474 A1 8/2020 Chen
(Continued)

FOREIGN PATENT DOCUMENTS

CN         111567070 A     8/2020
CN         111600682 A     8/2020
(Continued)

OTHER PUBLICATIONS

Huawei, Hi Silicon, "Discussion on remaining MAC open issues for 5G v2X with NR SL", 3GPP TSG-RAN WG2 Meeting #109-bis electronic, R2-20xxxxx, Apr. 20-30, 2020.
(Continued)

*Primary Examiner* — Jamaal Henson
(74) *Attorney, Agent, or Firm* — Price Heneveld LLP

(57) ABSTRACT

This application discloses a discontinuous reception control method and apparatus, a terminal, and a readable storage medium. The method includes: performing, by a first terminal, a first operation during sidelink-based transmission, where the first operation includes at least one of the following: the first terminal determines a status of whether to send a hybrid automatic repeat request HARQ feedback, and the first terminal decodes a data packet; and determining, by the first terminal based on an execution result of the first operation, whether to start a timer for controlling sidelink discontinuous reception.

17 Claims, 7 Drawing Sheets

12

Network-side device

11

11

Terminal

Terminal

(56) References Cited

U.S. PATENT DOCUMENTS

| | | | |
|---|---|---|---|
| 2021/0227602 A1* | 7/2021 | Li | H04W 76/14 |
| 2022/0166556 A1* | 5/2022 | Lee | H04L 1/1825 |
| 2022/0312241 A1* | 9/2022 | Xu | H04L 1/08 |
| 2023/0034294 A1* | 2/2023 | Zhang | H04W 52/0216 |
| 2023/0074206 A1* | 3/2023 | Zhang | H04L 1/1851 |
| 2023/0156602 A1* | 5/2023 | Park | H04W 52/0235 |
| | | | 370/311 |
| 2023/0164696 A1 | 5/2023 | Yang | |
| 2023/0189391 A1 | 6/2023 | Luo et al. | |

FOREIGN PATENT DOCUMENTS

| | | |
|---|---|---|
| JP | 2023536315 A | 8/2023 |
| WO | 2020030595 A1 | 2/2020 |
| WO | 2021145745 A1 | 7/2021 |
| WO | 2022027413 A1 | 2/2022 |

OTHER PUBLICATIONS

Alcatel-Lucent, Ericsson, Huawei, Marvell, Motorola, NEC, Nokia Corporation, Nokia Siemens Networks, Nortel, NTT Docomo, Orange, Qualcomm, Rim, Samsung, Sharp, NXP Semiconductors, Philips, ZTE, "Way Forward for DL HARQ operation with DRX", 3GPP TSG-RAN WG2 Meeting #59bis, R2-074562, Oct. 8-12, 2007, Shanghai, China.

Huawei, Hi Silicon, Discussion on remaining MAC open issues for 5G V2X with NR SL, 3GPP, TSG-RAN WG2 Meeting #110 electronic, R2-2005492, Jun. 1-12, 2020.

LG Electronics Inc. (Rapporteur), "Report of [Post109bis-e][957][V2X]: MAC issues (LG)", 3GPP TSG-RAN WG2 #110-e, R2-2005720, Jun. 1-12, 2020, Online.

LG Electronics Inc. (Rapporteur), Summary of MAC open issues for NR sidelink, 3GPP TSG-RAN WG2 #109-e, R2-2003757, Apr. 20-30, 2020, Online.

Intel Corporation, "Remaining opens of physical layer procedures for NR V2X sidelink design", 3GPP TSG RAN WG1 #102-E, R1-2005849, e-Meeting, Aug. 17-28, 2020.

Futurewei, "Groupcast HARQ feedback from RX UE without location information", 3GPP TSG-RAN WG2 Meeting #110-e, R2-2005515, Resubmission of R2-2003224, Electronic Meeting, Jun. 1-12, 2020.

* cited by examiner

Network-side device

11

11

Terminal

Terminal

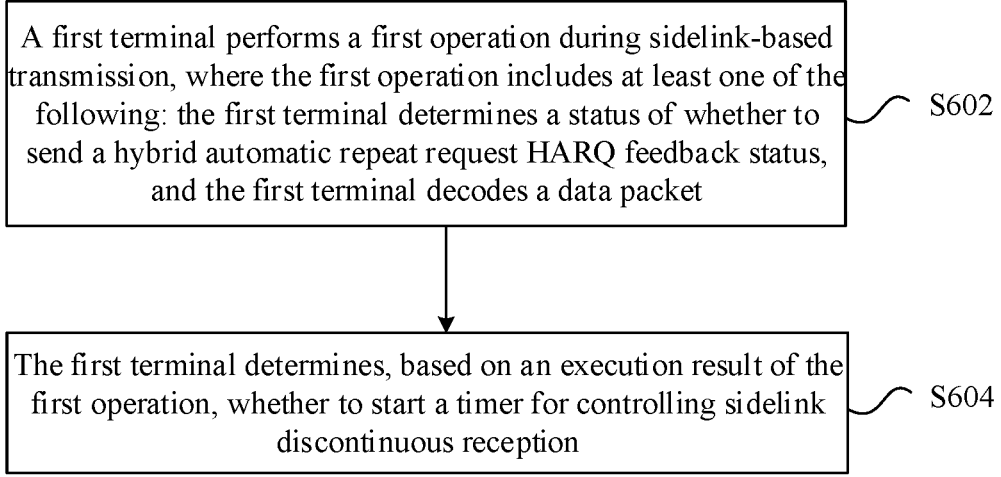

A first terminal performs a first operation during sidelink-based transmission, where the first operation includes at least one of the following: the first terminal determines a status of whether to send a hybrid automatic repeat request HARQ feedback status, and the first terminal decodes a data packet ⟋ S602

The first terminal determines, based on an execution result of the first operation, whether to start a timer for controlling sidelink discontinuous reception ⟋ S604

FIG. 6

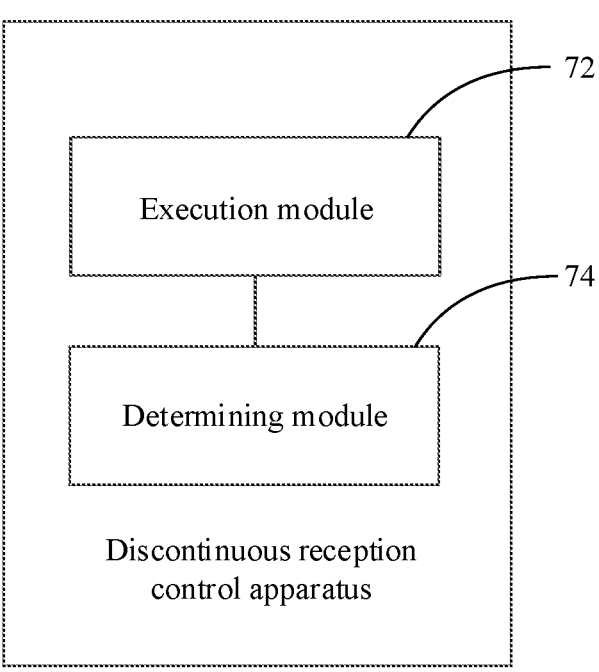

Execution module — 72

Determining module — 74

Discontinuous reception control apparatus

DISCONTINUOUS RECEPTION CONTROL METHOD AND APPARATUS, TERMINAL, AND READABLE STORAGE MEDIUM

CROSS-REFERENCE TO RELATED APPLICATIONS

This application is a continuation application of International Application No. PCT/CN2021/118466 filed on Sep. 15, 2021, which claims priority to Chinese Patent Application No. 202010997202.3, filed in China on Sep. 21, 2020, which are incorporated herein by reference in their entireties.

TECHNICAL FIELD

This application pertains to the field of communications technologies, and specifically relates to a discontinuous reception control method and apparatus, a terminal, and a readable storage medium.

BACKGROUND

In existing communication systems, discontinuous reception (DRX) is usually used to achieve the purpose of power saving, that is, a terminal in a DRX state does not need to continuously monitor a control channel. However, existing DRX mechanisms are applied to only uplink and downlink between a network-side device and a terminal. For sidelink, there is no applicable DRX configuration yet.

SUMMARY

According to a first aspect, a discontinuous reception control method is provided, including: performing, by a first terminal, a first operation during sidelink-based transmission, where the first operation includes at least one of the following: the first terminal determines a status of whether to send a hybrid automatic repeat request HARQ feedback, and the first terminal decodes a data packet; and determining, by the first terminal based on an execution result of the first operation, whether to start a timer for controlling sidelink discontinuous reception.

According to a second aspect, a discontinuous reception control apparatus is provided, including: an execution module, configured to perform a first operation during sidelink-based transmission, where the first operation includes at least one of the following: determining to send a hybrid automatic repeat request HARQ feedback status, and decoding a data packet; and a determining module, configured to determine, based on an execution result of the first operation, whether to start a timer for controlling sidelink discontinuous reception.

According to a third aspect, a terminal is provided, where the terminal includes a processor, a memory, and a program or instructions stored in the memory and capable of running on the processor, and when the program or instructions are executed by the processor, the steps of the method according to the first aspect are implemented.

According to a fourth aspect, a readable storage medium is provided, where a program or instructions are stored in the readable storage medium, and when the program or the instructions are executed by a processor, the steps of the method according to the first aspect are implemented.

According to a fifth aspect, a chip is provided, where the chip includes a processor and a communications interface, the communications interface is coupled to the processor, and the processor is configured to run a program or instructions to implement the method according to the first aspect.

According to a sixth aspect, a computer program product is provided, being stored in a non-volatile readable storage medium, where the computer program product is executed by at least one processor to implement the method according to the first aspect.

BRIEF DESCRIPTION OF DRAWINGS

FIG. 6 is a flowchart of a discontinuous reception control method according to an embodiment of this application;

FIG. 7 is a schematic structural diagram of a discontinuous reception control apparatus according to an embodiment of this application;

DETAILED DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

In the specification and claims of this application, the terms such as "first" and "second" are intended to distinguish between similar objects but do not necessarily indicate a specific order or sequence. It should be understood that the data used in this way is interchangeable in appropriate circumstances so that the embodiments of this application can be implemented in other orders than the order illustrated or described herein, and "first" and "second" are usually for distinguishing same-type objects but not limiting the number of objects, for example, a first object may be one or multiple. In addition, "and/or" in this specification and claims indicates at least one of connected objects, and the symbol "/" generally indicates that the associated objects are in an "or" relationship.

It should be noted that technologies described in the embodiments of this application are not limited to a long term evolution (LTE)/LTE-advanced (LTE-A) system, and may also be used in various wireless communication systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. Techniques described herein may be used in the aforementioned systems and radio technologies, and may also be used in other systems and radio technologies. In the following descriptions, a new radio (NR) system is described for an illustration purpose, and NR terms are used in most of the following descriptions, although these technologies may also be applied to other applications than an NR system application, for example, the 6th generation (6G) communication system.

Figure 1:
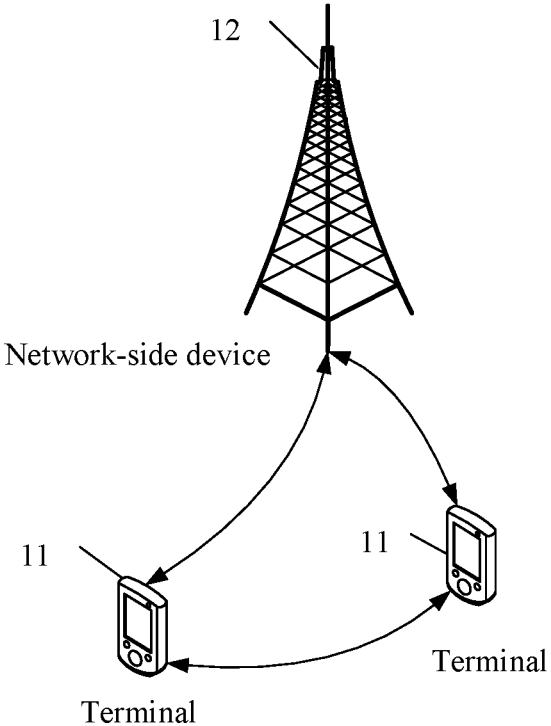
FIG. 1 is a block diagram of a wireless communication system to which embodiments of this application are applicable.

FIG. 1 is a block diagram of a wireless communication system to which the embodiments of this application are applicable. The wireless communication system includes a terminal 11 and a network-side device 12. The terminal 11 may also be referred to as a terminal device or user terminal (UE), and the terminal 11 may be a terminal-side device, such as a mobile phone, a tablet computer (Tablet Personal Computer), a laptop computer or a notebook computer, a personal digital assistant (PDA), a palmtop computer, a netbook, an ultra-mobile personal computer (UMPC), a mobile Internet device (MID), a wearable device or vehicle user equipment (VUE), or pedestrian user equipment (PUE). The wearable device includes: a wrist band, earphones, glasses, or the like. It should be noted that a specific type of the terminal 11 is not limited in the embodiments of this application. The network-side device 12 may be a base station or a core network. The base station may be referred to as an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission and reception Point (TRP), or another appropriate term in the art. Provided that a same technical effect is achieved, the base station is not limited to a specific technical term. It should be noted that in the embodiments of this application, the base station in the NR system is merely used as an example, and a specific type of the base station is not limited.

In addition, related terms in this application are described.

I. DRX in RRC_IDLE State

In a long term evolution (LTE) or 5G communication system, UE in an RRC_IDLE state needs to monitor, at a preconfigured time, paging signals sent by a base station. A process of monitoring paging signals is as follows.

Blind detection is performed for a physical downlink control channel (PDCCH) corresponding to a P-RNTI (Paging-RNTI). If the PDCCH is not detected, this detection ends; or if the PDCCH is detected, detection is further performed for a physical downlink shared channel PDSCH (Physical Downlink Shared Channel) indicated by the physical downlink control channel. If a detected PDSCH is not a paging signal of a current terminal, the detection ends; otherwise, the detected PDSCH is a paging signal of the current subscriber.

The terminal in the RCC_IDLE state regularly monitors paging signals, and a probability of receiving a paging signal belonging to the current terminal is relatively low. However, power consumption for monitoring the PDCCH and PDSCH each time is relatively large, not conducive to power saving for the terminal.

II. DRX in RRC Connected State

The purpose of DRX is power saving, and a terminal in a DRX state does not need to continuously monitor control channels. However, if the terminal does not monitor a control channel for a long time, a delay of data transmission may be increased for any data newly arrived. Considering a balance between power saving and transmission delay, based on a time length of channel monitoring by the terminal, 5G MAC supports two DRX cycles: long DRX cycle and short DRX cycle. If it is predicted that a data volume of the terminal is relatively frequent or the service is relatively sensitive to delay, the network may configure that the terminal uses short DRX cycle; or if it is predicted that a data volume of the terminal is relatively sparse or the service is not sensitive to delay, the network may configure that the terminal uses only long DRX cycle. In order to facilitate switching between the long DRX cycle and the short DRX cycle by the terminal, the long DRX cycle needs to be an integer multiple of the short DRX cycle, so as to ensure alignment of onduration of the long DRX cycle and the short DRX cycle.

In order to support the DRX mechanism, the base station configures DRX-related timers and parameters for the terminal, specifically including:

(1) drx-LongCycleStartOffset: used to configure a periodicity and offset of the long DRX cycle, where units of periodicity and offset are milliseconds.

(2) drx-ShortCycle: used to configure a periodicity and offset of the short DRX cycle, where units of periodicity and offset are milliseconds.

(3) drx-ShortCycleTimer: used to control a duration of the short DRX cycle used by the terminal, in unit of an integer, indicating that the terminal needs to maintain an integer multiple of the short cycle once entering the short DRX cycle.

(4) drx-onDurationTimer: a DRX onduration timer, where during running of this timer, the terminal needs to continuously monitor a PDCCH control channel of the network, and a unit of this timer is milliseconds.

(5) drx-SlotOffset: a delay of starting drx-onDurationTimer by the terminal, where this parameter is used to set an offset of a starting time point of DRX onduration with respect to a starting point of the subframe, and the offset is an integer multiple of $\frac{1}{32}$ milliseconds.

(6) drx-InactivityTimer: a DRX inactivity timer, where this timer is started on the first symbol after a terminal receives PDCCH signaling for scheduling uplink/downlink new data; and during running of this timer, the terminal needs to continuously monitor a control channel, and a unit of this timer is milliseconds.

(7) drx-HARQ-RTT-TimerDL: a downlink hybrid automatic repeat request (Hybrid Automatic Repeat reQuest, HARQ) round-trip time (RTT) timer, where, based on maintenance of each downlink process, a timer length is a minimum time interval between a time point of HARQ feedback and reception of HARQ retransmission for the process; the terminal starts the timer on the first symbol after HARQ NACK feedback for the process only when data corresponding to the downlink process is not successfully decoded; and if the current terminal is running only drx-HARQ-RTT-TimerDL and/or drx-HARQ-RTT-TimerUL, the terminal does not need to monitor a PDCCH control channel, and a unit of this timer is symbols.

(8) drx-HARQ-RTT-TimerUL: an uplink HARQ RTT timer, where, based on maintenance of each uplink process, a length of the timer is a minimum time interval between a time point of PUSCH transmission and reception of HARQ retransmission for the process; after the uplink PUSCH transmission, the terminal starts an uplink HARQ RTT timer for the uplink process; if the PUSCH transmission uses PUSCH repetition (PUSCH repetition), the uplink HARQ RTT timer is started after the first PUSCH repetition, so as to ensure that PUSCH repetition transmission can be stopped in a timely manner after the base station parses out the PUSCH in advance; and a unit of this timer is symbols.

(9) drx-RetransmissionTimerDL: a downlink retransmission timer, where this timer is started on a next symbol after expiration of drx-HARQ-RTT-TimerDL; during running of this timer, the terminal monitors a control channel of the network, and stops the timer if the terminal receives downlink scheduling information or a downlink configured grant for the process; and a unit of this timer is slots (time slot).

(10) drx-RetransmissionTimerUL: an uplink retransmission timer, where this timer is started on a next symbol after expiration of drx-HARQ-RTT-TimerUL; during running of this timer, the terminal monitors a control channel of the network, and the timer stops running if the terminal receives uplink scheduling information or an uplink configured grant for the process; and a unit of this timer is slots (time slot).

It should be noted that the foregoing describes a basic mechanism of the existing DRX and related parameters included, all these parameters form a DRX configuration, and the terminal performs corresponding discontinuous reception operations according to the configuration.

Figure 2:
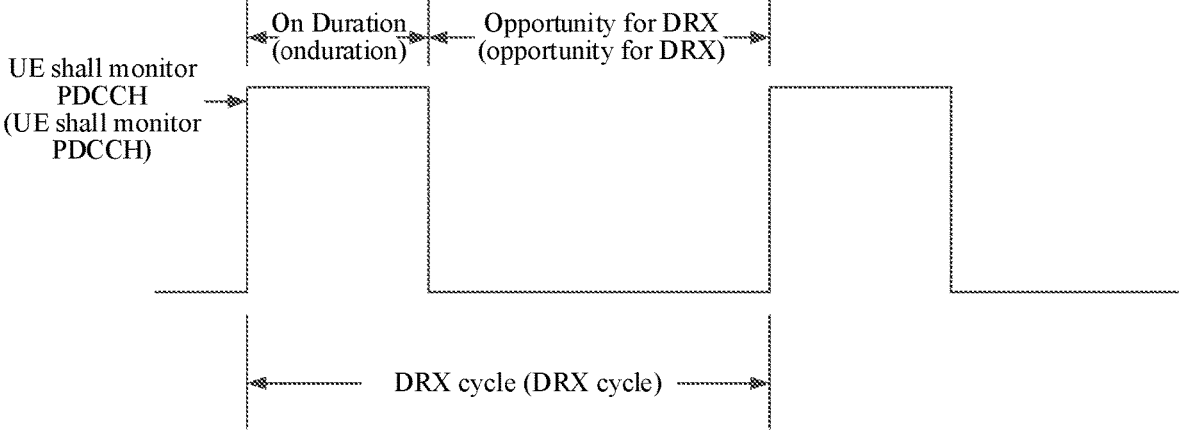
FIG. 2 is a schematic diagram of a DRX cycle in time domain according to an embodiment of this application.
Figure 3:
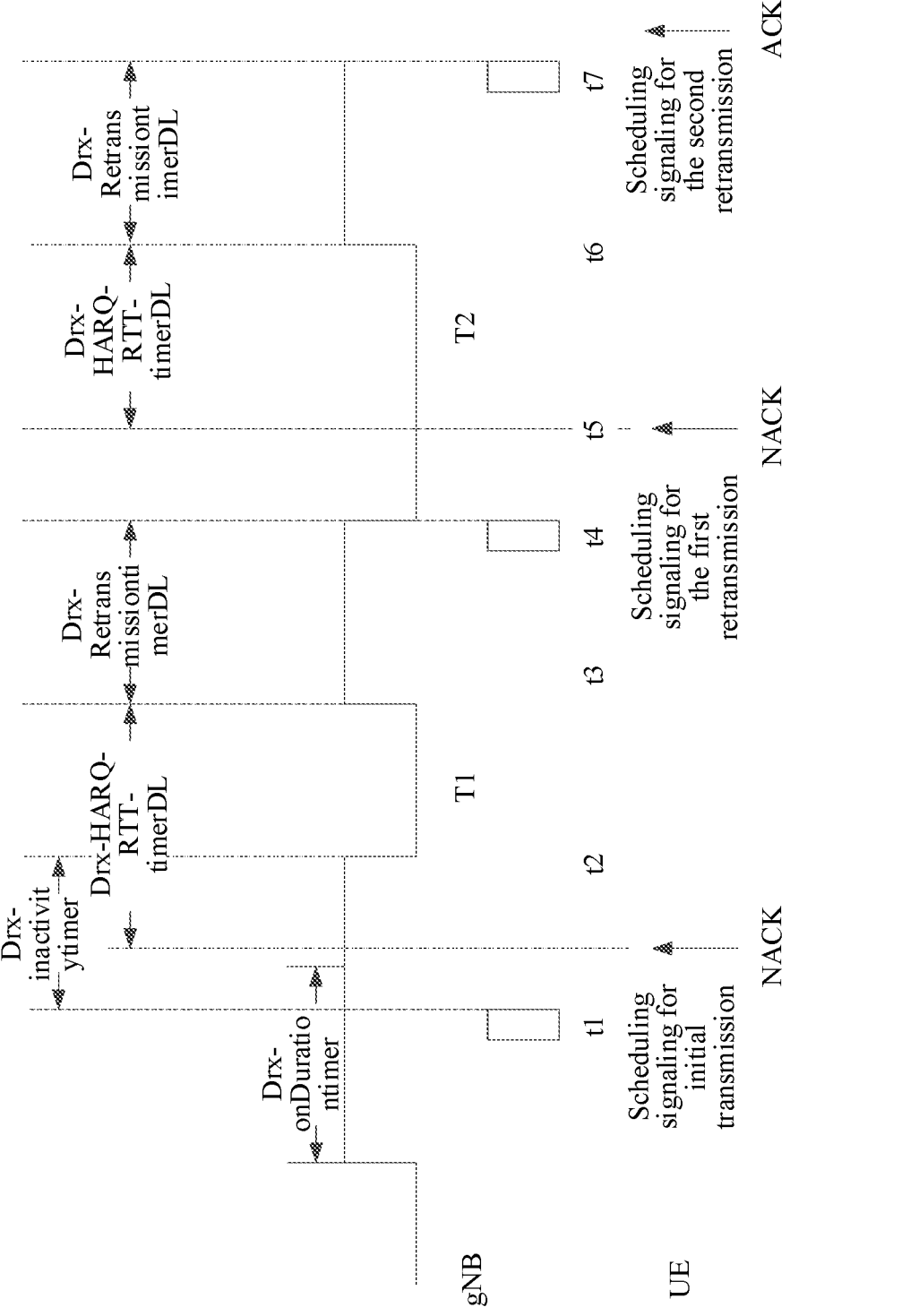
FIG. 3 is a schematic diagram of DRX types according to an embodiment of this application.

It can be learned from FIG. 2 that time is divided into consecutive DRX cycles in time domain. Further, as shown in FIG. 3, DRX is divided into two different types. In order to further reduce power consumption on blind detection for paging signals or PDCCH in the foregoing two types of DRX, concepts of a wake-up signal (WUS) and sleep signal (collectively referred to as energy saving signal/power saving signal) are proposed.

III. Energy-Saving Signal in RRC_IDLE or RRC Inactive State

In every paging cycle in the idle state, before PO (Paging Occasion), the base station transmits an energy-saving signal to the UE, and the UE monitors the energy-saving signal at a corresponding time.

If the energy-saving signal indicates the UE to monitor PDCCH at the PO time, the UE monitors the PDCCH; or if the energy-saving signal does not indicate the UE to monitor the PDCCH at the PO time, the terminal does not monitor the PDCCH, where monitoring a wake-up signal is less complex and more power efficient than blind detection on paging signals or PDCCH.

IV. Energy-Saving Signal in RRC_Connected State

In each CDRX cycle in the RRC connected state, before the onduration or at a starting time point of the onduration, the base station transmits an energy-saving signal to the UE, and the UE monitors the energy-saving signal at a corresponding time.

If the energy-saving signal indicates the UE to monitor PDCCH during onduration, the UE monitors the PDCCH; or if the energy-saving signal does not indicate the UE to monitor the PDCCH during onduration, the UE does not monitor the PDCCH, where monitoring a wake-up signal is less complex and more power efficient than blind detection on paging signals or PDCCH.

Figure 4:
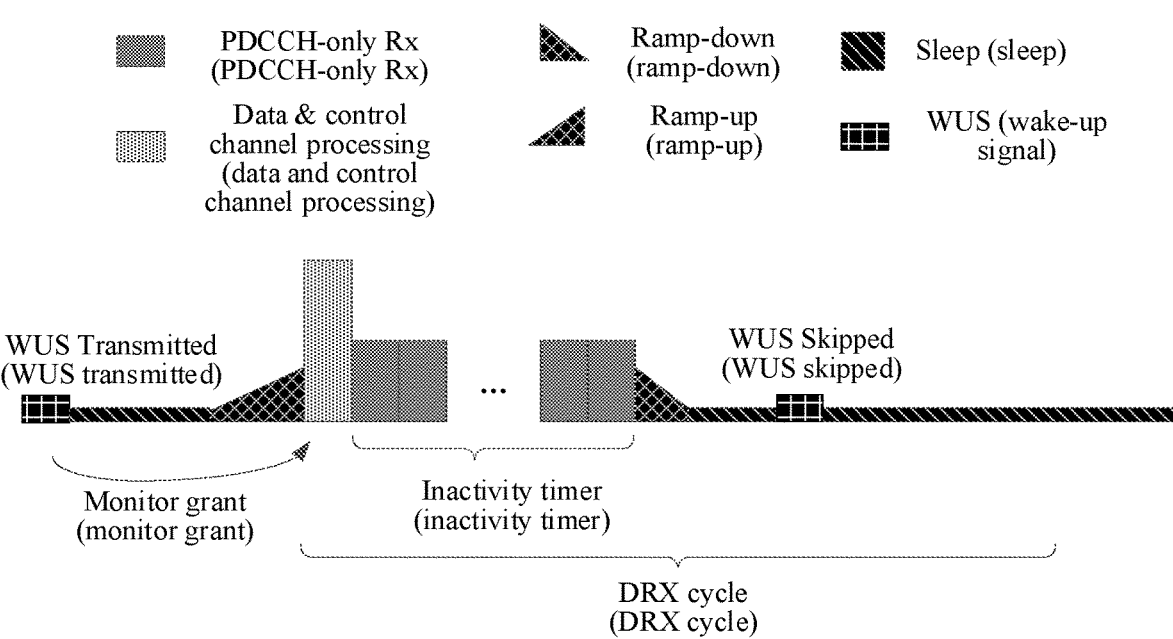
FIG. 4 is a schematic diagram of a time flow of wake-up signaling before CDRX on-duration starts according to an embodiment of this application.

FIG. 4 illustrates a time flow of wake-up signaling before CDRX on-duration starts. The foregoing energy-saving signal may be a signal similar to PDCCH, or a sequence-related signal such as a CSI-RS or OOK (on-off keying) signal.

V. Sidelink

Figure 5:
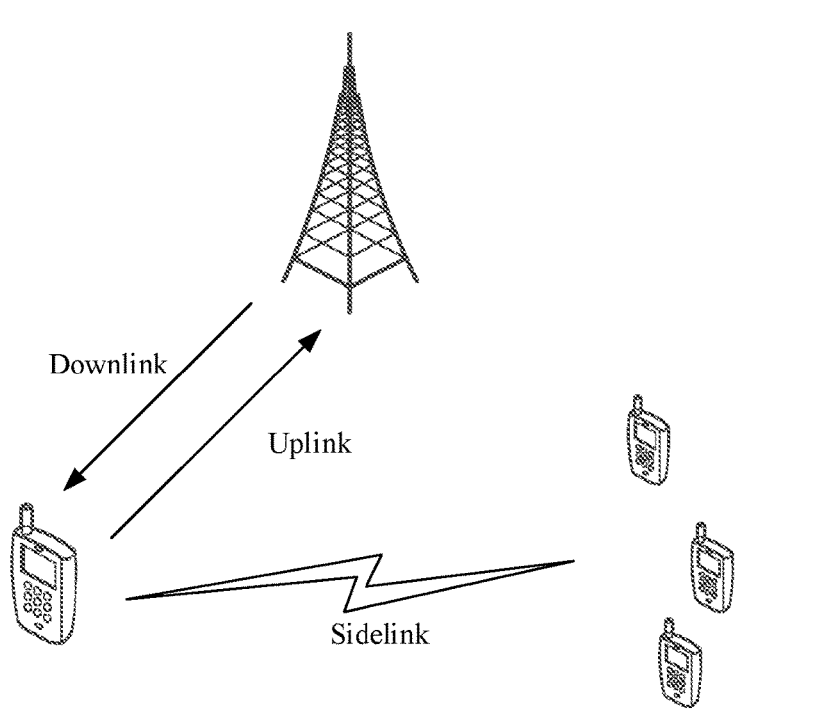
FIG. 5 is a schematic diagram of sidelink according to an embodiment of this application.

An LTE system supports sidelink from release 12. Sidelink is used for direct data transmission between terminals without network devices. FIG. 5 shows LTE Uplink/Downlink/Sidelink.

The design of LTE sidelink is applicable to specified public safety affairs (for example, emergency communication in disaster sites such as fire or earthquake) or vehicle to everything (V2X) communication. Vehicle to everything communication includes various services, such as basic safety communication, advanced (autonomous) driving, platooning, sensor expansion, and so on. LTE sidelink supports only broadcast communication, mainly used for basic safety communication. Other advanced V2X services with strict QoS requirements in terms of delay and reliability are supported by NR sidelink.

A 5G NR system may be used for an operating frequency band above 6 GHz that LTE does not support, and supports a larger operating bandwidth. However, an NR system in a current release supports only an interface between a base station and a terminal, and does not yet support a sidelink interface for direct communication between terminals.

VI. Sidelink Transmission Mode

Currently, sidelink transmission is mainly divided into the following transmission modes: broadcast, groupcast, and unicast. Unicast, as the name implies, is one-to-one transmission, groupcast is one-to-many transmission, and broadcast is also one-to-many transmission, and broadcast does not have a concept of UEs belonging to one group.

VII. At Present, Sidelink Unicast and Groupcast Communication Supports the Physical Layer HARQ Feedback Mechanism.

1. Resource Allocation Mode: Mode 1 and Mode 2

The resource allocation modes for sidelink UEs are divided into two types:

(1) base station scheduling mode (Mode 1): BS schedules SL resource(s) to be used by UE for SL transmission(s): A network-side device (base station) performs controlling and allocates resources for each UE; and (2) UE autonomous mode (Mode 2): UE determines, i.e. BS does not schedule, SL transmission resource(s) within SL resources configured by BS/network or preconfigured SL resources. Each UE autonomously selects resources.

VIII. HARQ Feedback for Sidelink Groupcast

HARQ feedback for sidelink is sent and received on a PSFCH channel. Currently, two options (or types) are defined: the first option is that a plurality of UEs share a PSFCH resource and send NACK on the PSFCH or send no feedback; and the second option is that each UE needing to send feedback has a dedicated PSFCH resource on which ACK or NACK can be sent. For the first option (type), whether the UE sends feedback further depends on a location of the UE; and a feedback message needs to be sent only when the location of the UE meets a requirement.

The following describes in detail a discontinuous reception control method provided in the embodiments of this application by using specific embodiments and application scenarios thereof with reference to the accompanying drawings.

This application provides a discontinuous reception control method. FIG. 6 is a flowchart of the discontinuous reception control method according to an embodiment of this application. As shown in FIG. 6, the method includes the following steps.

Step S602: A first terminal performs a first operation during sidelink-based transmission, where the first operation includes at least one of the following: the first terminal determines a status of whether to send a hybrid automatic repeat request HARQ feedback, and the first terminal decodes a data packet.

Step S604: The first terminal determines, based on an execution result of the first operation, whether to start a timer for controlling sidelink discontinuous reception.

According to step S602 and step S604 in this embodiment of this application, during sidelink-based transmission, based on a status of determining whether to send a hybrid automatic repeat request HARQ feedback status and a result of decoding a data packet by the first terminal, the first terminal may determine whether to start a timer for controlling sidelink discontinuous reception. In this way, whether to start the timer for controlling sidelink discontinuous reception is controlled to implement control on sidelink discontinuous reception DRX, so as to resolve the prior-art problem that an existing DRX mechanism is applied to only uplink and downlink between a network-side device and a terminal, resulting in relatively simple application scenarios of DRX configurations.

In an optional implementation of this embodiment of this application, before the first terminal performs the first operation in step S602, the method in this embodiment of this application may further include the following step.

Step S601: The first terminal receives sidelink control information (SCI) sent by a second terminal.

The SCI is used to indicate at least one of the following: the first terminal is configured with HARQ enable (HARQ enable), the first terminal uses a negative-only acknowledgement information mode (negative-only acknowledgement), and the first terminal uses a negative-positive acknowledgement information mode (negative-positive acknowledgement).

It should be noted that the steps of the method in this embodiment of this application may be applicable to transmission modes of unicast, groupcast, and broadcast in sidelink transmission. In this application, HARQ enable may be used to indicate use of HARQ feedback being allowed or use of HARQ feedback being not allowed; in this case, whether to perform HARQ feedback depends on the terminal. HARQ enable may further be used to indicate HARQ feedback being required or not required; in this case, the first terminal needs to feed back a HARQ result to the second terminal. Negative-only acknowledgment may also be referred to as type-1/option-1 in this embodiment of this application, and mainly indicates that a receiving terminal does not send HARQ feedback when a data packet is received or decoded successfully, and sends NACK when reception or decoding fails. In addition, for negative-only acknowledgment, a terminal at the receive end (first terminal) further calculates, based on information in the SCI, a distance between the first terminal and a terminal at the transmit end (second terminal) or a zone in which the terminal at the transmit end is located, and compares this distance with a communication range indicated in the SCI. When the distance is greater than or equal to the communication range, the terminal at the receiving end may not send any HARQ feedback. Negative-positive acknowledgment mainly indicates that the terminal at the receiving end sends HARQ feedback ACK when a data packet is received or decoded successfully, and sends NACK when reception or decoding fails.

In addition, in an optional implementation in this embodiment of this application, network-side configuration may alternatively be used to indicate HARQ enable and use of which feedback mode (negative-only acknowledgment or negative-positive acknowledgment).

The following describes in detail this application in combination with indication by SCI, and a data decoding status and HARQ feedback status of the terminal.

Optional implementation 1: In a case that the SCI indicates, to the first terminal, HARQ enable and/or use of negative-positive acknowledgment, a manner of determining, by the first terminal, based on the execution result of the first operation, whether to start the timer for controlling sidelink discontinuous reception in step S604 in this embodiment of this application may further include the following steps.

Step S604-11: After the first terminal sends HARQ feedback to the second terminal, the first terminal starts a first timer in timers for controlling sidelink discontinuous reception, where the HARQ feedback is positive feedback ACK or negative feedback NACK.

Step S604-12: In a case that the first timer expires and decoding of a data packet by the first terminal succeeds or fails, the first terminal starts a second timer in timers for controlling sidelink discontinuous reception.

During running of the first timer, the first terminal does not monitor a physical sidelink control channel (PSCCH) and/or a physical sidelink shared channel (PSSCH); and during running of the second timer, the first terminal monitors the PSCCH and/or the PSSCH.

It can be learned that in the foregoing steps S604-11 and S604-12, during running of the first timer, the first terminal does not monitor the PSCCH and/or the PSSCH; and during running of the second timer, the first terminal monitors the PSCCH and/or the PSSCH, thereby implementing discontinuous reception transmitted on sidelink and achieving the effect of power saving.

It should be noted that the first timer in this embodiment of this application may be drx-HARQ-RTT-TimerSL in a specific application scenario. The second timer in this embodiment of this application may be drx-Retransmission-TimerSL in a specific application scenario. Certainly, the first timer and the second timer are only examples, and other timers capable of implementing the foregoing functions also fall within the protection scope of this application.

In addition, a running duration of the timer involved in this embodiment of this application may be specified by a protocol, configured by the base station, or configured by peer UE. Further, in a specific application scenario, for the first timer, a specific value of the duration may refer to an interval between sending of HARQ feedback and reception of HARQ retransmission by the terminal.

The optional implementation 1 in a specific application scenario may include the following steps.

Step S11: The second terminal sends sidelink data to the first terminal.

Step S12: The first terminal sends SCI corresponding to the data, where the SCI indicates HARQ enable and indicates use of negative-positive acknowledgment.

Step S13: The first terminal sends HARQ feedback to UE1 based on whether decoding of the data packet succeeds or fails, and starts drx-HARQ-RTT-TimerSL after sending the feedback.

Step S14: In a case that drx-HARQ-RTT-TimerSL expires and the first terminal successfully decodes the data packet, drx-RetransmissionTimerSL is still started.

Optional implementation 2: In a case that the SCI indicates, to the first terminal, HARQ enable and/or use of negative-positive acknowledgment, a manner of determining, by the first terminal, based on the execution result of the first operation, whether to start the timer for controlling sidelink discontinuous reception in step S604 in this embodiment of this application may further include the following steps.

Step S604-21: After the first terminal sends HARQ feedback to the second terminal, in a case that the HARQ feedback is NACK, the first terminal starts a first timer in timers for controlling sidelink discontinuous reception, where the first terminal does not start the first timer in a case that the HARQ feedback is ACK.

Step S604-22: In a case that the first timer expires and decoding of a data packet by the first terminal succeeds or fails, the first terminal starts a second timer in timers for controlling sidelink discontinuous reception.

During running of the first timer, the first terminal does not monitor a PSCCH and/or a PSSCH; and during running of the second timer, the first terminal monitors the PSCCH and/or the PSSCH.

Through the foregoing step S604-21 and step S604-22, it can be learned that in a case that the HARQ feedback is NACK, the first terminal starts the first timer, and in a case that the first timer expires, the second timer is started regardless of whether decoding of the data packet by the first terminal succeeds or fails, so as to implement discontinuous reception transmitted on sidelink and achieve the effect of power saving.

The optional implementation 2 in a specific application scenario may include the following steps.

Step S21: The second terminal sends sidelink data to the first terminal, where SCI corresponding to the sent data indicates HARQ enable and indicates use of negative-positive acknowledgment.

Step S22: The first terminal sends HARQ feedback to the second terminal based on whether decoding of the data packet succeeds or fails, and starts drx-HARQ-RTT-TimerSL after sending the feedback.

Step S23: In a case that drx-HARQ-RTT-TimerSL expires and decoding of the data packet fails, the first terminal starts drx-RetransmissionTimerSL.

Optional implementation 3: In a case that the SCI indicates, to the first terminal, HARQ enable and/or use of negative-positive acknowledgment, a manner of determining, by the first terminal, based on the execution result of the first operation, whether to start the timer for controlling sidelink discontinuous reception in step S604 in this embodiment of this application may further include the following steps.

Step S604-31: After the first terminal sends HARQ feedback to the second terminal, the first terminal starts a first timer in timers for controlling sidelink discontinuous reception, where the HARQ feedback is positive feedback ACK or negative feedback NACK.

Step S604-32: In a case that the first timer expires, the first terminal starts a second timer in timers for controlling sidelink discontinuous reception.

During running of the first timer, the first terminal does not monitor a PSCCH and/or a PSSCH; and during running of the second timer, the first terminal monitors the PSCCH and/or the PSSCH.

Through the foregoing steps S604-31 and S604-32, regardless of whether the HARQ feedback is ACK or NACK, the first terminal starts the first timer; and when the first timer expires, the first terminal starts the second timer. That is, when the first timer expires, the second timer is started, so that the first terminal can monitor the PSCCH and/or PSSCH based on different time periods, thereby implementing discontinuous reception transmitted on sidelink and achieving the effect of power saving.

Optional implementation 4: In a case that the SCI indicates, to the first terminal, HARQ enable and/or use of negative-positive acknowledgment, a manner of determining, by the first terminal, based on the execution result of the first operation, whether to start the timer for controlling sidelink discontinuous reception in step S604 in this application may further include the following step.

Step S604-41: In a case that a duration of decoding a data packet exceeds a preset duration or decoding fails, the first terminal starts a second timer in timers for controlling sidelink discontinuous reception.

The preset duration includes at least one of the following: a running duration of a third timer, a duration specified by a protocol, and a duration configured by a network-side device; and during running of the second timer, the first terminal monitors a PSCCH or PSSCH.

It can be learned that in the step S604-41 in this embodiment of this application, provided that a time of decoding the data packet by the first terminal exceeds the preset duration and the decoding fails, the second timer is started. That is, during running of the second timer, monitoring for the PSCCH and/or PSSCH is performed, so as to implement sidelink discontinuous reception and achieve the effect of power saving.

Optional implementation 5: In a case that the SCI indicates, to the first terminal, HARQ enable and/or use of negative-only acknowledgment, a manner of determining, by the first terminal, based on the execution result of the first operation, whether to start the timer for controlling sidelink discontinuous reception in step S604 in this embodiment of this application may further include the following step.

Step S604-51: In a case that a distance between the first terminal and the second terminal is greater than or equal to a communication range requirement, the first terminal determines not to send the HARQ feedback and not to start a first timer and a second timer in timers for controlling sidelink discontinuous reception.

During running of the first timer, the first terminal does not monitor a PSCCH and/or a PSSCH; and during running of the second timer, the first terminal monitors the PSCCH and/or the PSSCH.

The optional implementation 5 in a specific application scenario may include the following steps.

Step S31: The second terminal sends sidelink data to the first terminal, where SCI corresponding to the sent data indicates HARQ enable and indicates use of negative-only acknowledgment.

Step S32: The first terminal obtains, through calculation based on information in the received SCI, for example, zone-related information, that a distance between the first terminal and the second terminal (for example, calculating a distance between a location of the second terminal and a central position of a nearest zone indicated by the SCI) is greater than a communication range requirement.

Step S33: The first terminal does not send NACK, nor starts drx-HARQ-RTT-TimerSL or drx-RetransmissionTimerSL.

Through the foregoing step S604-51, in a case that it is determined that the distance between the first terminal and the second terminal is greater than or equal to the communication range requirement, the first terminal sends no HARQ feedback, nor starts the first timer or the second timer.

Optional implementation 6: In a case that the SCI indicates, to the first terminal, HARQ enable and/or use of negative-only acknowledgment, a manner of determining, by the first terminal, based on the execution result of the first operation, whether to start the timer for controlling sidelink discontinuous reception in step S604 in this embodiment of this application may further include the following steps.

Step S604-61: In a case that a distance between the first terminal and the second terminal is greater than or equal to a communication range requirement, after decoding of a data packet succeeds or fails and a HARQ feedback being NACK is sent, or after decoding of a data packet succeeds or fails and the first terminal determines not to send the HARQ feedback, the first terminal starts a first timer in timers for controlling sidelink discontinuous reception.

Step S604-62: In a case that the first timer expires, the first terminal starts a second timer in timers for controlling sidelink discontinuous reception.

During running of the first timer, the first terminal does not monitor a PSCCH and/or a PSSCH; and during running of the second timer, the first terminal monitors the PSCCH and/or the PSSCH.

Through the foregoing steps S604-61 and S604-62, in a case of using negative-only acknowledgment, even if the distance between the first terminal and the second terminal is greater than or equal to the communication range requirement, after decoding of the data packet succeeds or fails and the HARQ feedback being NACK is sent, or after decoding of the data packet by the first terminal succeeds or fails and sends no HARQ feedback, the first terminal may also start the first timer, and starts the second timer in a case that the first timer expires. That is, in a case that the distance between the first terminal and the second terminal is greater than or equal to the communication range requirement, the first timer and the second timer can also be started to implement sidelink discontinuous reception and achieve power saving during sidelink transmission.

The foregoing optional implementation in a specific application scenario may include the following steps.

Step S41: The second terminal sends sidelink data to the first terminal, where SCI corresponding to the sent data indicates HARQ enable and indicates use of negative-only acknowledgment.

Step S42: The first terminal obtains, through calculation based on information in the received SCI, for example, zone-related information, that a distance between the first terminal and the second terminal (for example, calculating a distance between a location of the second terminal and a central position of a nearest zone indicated by the SCI) is greater than a communication range requirement.

Step S43: The first terminal does not send NACK, but still starts drx-HARQ-RTT-TimerSL.

Step S44: In a case that drx-HARQ-RTT-TimerSL expires, the first terminal starts drx-RetransmissionTimerSL.

It can be learned that through the foregoing steps S21 to S24, although the first terminal does not perform HARQ feedback, other groupcast terminals may perform HARQ feedback, and drx-RetransmissionTimerSL can be still started to wait for retransmission by other terminals or new transmission scheduled for other terminals.

Optional implementation 7: In a case that the SCI indicates, to the first terminal, HARQ enable and/or use of negative-only acknowledgment, a manner of determining, by the first terminal, based on the execution result of the first operation, whether to start the timer for controlling sidelink discontinuous reception in step S604 in this embodiment of this application may further include the following steps.

Step S604-71: In a case that a distance between the first terminal and the second terminal is greater than or equal to a communication range requirement, the first terminal determines not to feed back the HARQ feedback but starts a first timer in timers for controlling sidelink discontinuous reception.

Step S604-72: In a case that the first timer expires and decoding of a data packet by the first terminal succeeds or fails, the first terminal starts a second timer in timers for controlling sidelink discontinuous reception.

During running of the first timer, the first terminal does not monitor a PSCCH and/or a PSSCH; and during running of the second timer, the first terminal monitors the PSCCH and/or the PSSCH.

Through the foregoing steps S604-71 and S604-72, in a case of using negative-only acknowledgment, even if the distance between the first terminal and the second terminal is greater than or equal to the communication range requirement, the first terminal sends no HARQ feedback and the first terminal may also start the first timer; and in a case that the first timer expires, the second timer may be also started even if decoding of the data by the first terminal fails. That is, in a case that the distance between the first terminal and the second terminal is greater than or equal to the communication range requirement, the first timer and the second timer can also be started to implement sidelink discontinuous reception and achieve power saving during sidelink transmission.

The optional implementation 7 in a specific application scenario may include the following steps.

Step S51: The second terminal sends sidelink data to the first terminal, where SCI corresponding to the sent data indicates HARQ enable and indicates use of negative-only acknowledgment.

Step S52: The first terminal obtains, through calculation based on information in the received SCI, for example, zone-related information, that a distance between the first terminal and the second terminal (for example, calculating a distance between a location of the second terminal and a central position of a nearest zone indicated by the SCI) is greater than a communication range requirement.

Step S53: The first terminal does not send NACK, but still starts drx-HARQ-RTT-TimerSL.

Step S54: When the drx-HARQ-RTT-TimerSL expires, the first terminal starts, based on a status of decoding a data packet corresponding to a HARQ process, drx-RetransmissionTimerSL when the decoding fails.

Optional implementation 8: In a case that the SCI indicates, to the first terminal, HARQ enable and/or use of negative-only acknowledgment, a manner of determining, by the first terminal, based on the execution result of the first operation, whether to start the timer for controlling sidelink discontinuous reception in step S604 in this embodiment of this application may further include the following step.

Step S604-81: In a case that a duration of decoding a data packet corresponding to a HARQ process exceeds a preset duration and decoding fails, the first terminal starts a second timer in timers for controlling sidelink discontinuous reception.

The preset duration includes at least one of the following: a running duration of a third timer, a duration specified by a protocol, and a duration configured by a network-side device; and during running of the second timer, the first terminal monitors a PSCCH or PSSCH.

It can be learned that in the step S604-81 in this embodiment of this application, provided that a time of decoding the data packet by the first terminal exceeds the preset duration and the decoding fails, the second timer is started. That is, during running of the second timer, monitoring for the PSCCH or PSSCH is performed, so as to implement sidelink discontinuous reception and achieve the effect of power saving.

Optional implementation 9: In a case that the SCI indicates, to the first terminal, HARQ enable and/or use of negative-only acknowledgment, a manner of determining, by the first terminal, based on the execution result of the first operation, whether to start the timer for controlling sidelink discontinuous reception in step S604 in this embodiment of this application may further include the following steps.

Step S604-91: In a case that it is determined, according to SCI, that a distance between the first terminal and the second terminal is less than a communication range requirement, the first terminal determines to send HARQ feedback.

Step S604-92: After the HARQ feedback is sent, the first terminal starts a first timer in timers for controlling sidelink discontinuous reception.

Step S604-93: In a case that the first timer expires and decoding of a data packet by the first terminal fails, the first terminal starts a second timer in timers for controlling sidelink discontinuous reception.

During running of the first timer, the first terminal does not monitor a PSCCH and/or a PSSCH; and during running of the second timer, the first terminal monitors the PSCCH and/or the PSSCH.

Through the foregoing steps S604-91 to S604-93, in a case of using negative-only acknowledgment, even if the distance between the first terminal and the second terminal is less than the communication range requirement, the first terminal determines to send HARQ feedback. After sending the HARQ, the first terminal starts the first timer; and in a case that the first timer expires, the second timer may be also started even if decoding of the data by the first terminal fails. That is, in a case that the distance between the first terminal and the second terminal is less than the communication range requirement, the first timer and the second timer can also be started to implement sidelink discontinuous reception and achieve power saving during sidelink transmission.

The optional implementation 9 in a specific application scenario may include the following steps.

Step S61: The second terminal sends sidelink data to the first terminal, where SCI corresponding to the sent data indicates HARQ enable and indicates use of negative-only acknowledgment.

Step S62: The first terminal obtains, through calculation based on information in the received SCI, for example, zone-related information, that a distance between the first terminal and UE2 (for example, calculating a distance between a location of the UE2 and a central position of a nearest zone indicated by the SCI) is less than or equal to a communication range requirement.

Step S63: In a case that decoding of a data packet fails, the first terminal sends NACK and starts drx-HARQ-RTT-TimerSL.

Step S64: In a case that drx-HARQ-RTT-TimerSL expires, the first terminal starts drx-RetransmissionTimerSL.

It can be learned from the foregoing optional implementations 1 to 9 that, for drx-RetransmissionTimerSL, drx-RetransmissionTimerSL may be started when at least one of the following conditions is satisfied:

(1) drx-HARQ-RTT-TimerSL expires;
(2) data corresponding to a HARQ process is not successfully decoded; and
(3) the SCI indicates negative-positive acknowledgment, and the data corresponding to the HARQ process is successfully decoded.

Optionally, the first operation in this embodiment of this application may further include: the first terminal determines whether physical sidelink shared channel PSSCH transmission has been performed. Based on this, a manner of determining, by the first terminal, based on the execution result of the first operation, whether to start the timer for controlling sidelink discontinuous reception in step S604 in this embodiment of this application may further include: in a case that the first terminal determines that physical sidelink shared channel PSSCH transmission has been performed, the first terminal starts a timer for controlling sidelink discontinuous reception.

A mode of the PSSCH transmission includes one of the following: performing transmission using a resource pool of a base station scheduling mode (corresponding to the foregoing mode-2) for resource allocation; and performing transmission using a configuration grant (configured grant) or dynamic grant in a terminal autonomous mode (corresponding to the foregoing mode-1) for resource allocation.

It should be noted that the discontinuous reception control method in the embodiments of this application may be executed by a discontinuous reception control apparatus, or by a control module for executing the discontinuous reception control method in the discontinuous reception control apparatus. In the embodiments of this application, the discontinuous reception control apparatus provided by the embodiments of this application is described by using the discontinuous reception control method being executed by the discontinuous reception control apparatus as an example.

FIG. 7 is a schematic structural diagram of a discontinuous reception control apparatus according to an embodiment of this application. As shown in FIG. 7, the apparatus includes:

an execution module 72, configured to perform a first operation during sidelink-based transmission, where the first operation includes at least one of the following: determining to send a hybrid automatic repeat request HARQ feedback status, and decoding a data packet; and a determining module 74, configured to determine, based on an execution result of the first operation, whether to start a timer for controlling sidelink discontinuous reception.

Optionally, the apparatus in this embodiment of this application may further include: a receiving module, configured to: before the first operation is performed, receive sidelink control information SCI sent by a second terminal.

The SCI is used to indicate at least one of the following: HARQ enable, use of a negative-only acknowledgement information mode (negative-only acknowledgement), and use of a negative-positive acknowledgement information mode (negative-positive acknowledgement).

Optionally, in a case that the SCI indicates HARQ enable and/or use of negative-positive acknowledgement, the determining module 74 in this embodiment of this application may further include: a first starting unit, configured to: after HARQ feedback is sent to the second terminal, start a first timer in timers for controlling sidelink discontinuous reception, where the HARQ feedback is positive feedback ACK or negative feedback NACK; and a second starting unit, configured to: in a case that the first timer expires and decoding of a data packet succeeds or fails, start a second timer in timers for controlling sidelink discontinuous reception.

Monitoring for a PSCCH and/or PSSCH is not performed during running of the first timer; and monitoring for the PSCCH and/or PSSCH is performed during running of the second timer.

Optionally, in a case that the SCI indicates HARQ enable and/or use of negative-positive acknowledgement, the determining module 74 in this embodiment of this application may further include: a third starting unit, configured to: after HARQ feedback is sent to the second terminal, in a case that the HARQ feedback is NACK, start a first timer in timers for controlling sidelink discontinuous reception, where the first timer is not started in a case that the HARQ feedback is ACK; and a fourth starting unit, configured to: in a case that the first timer expires and decoding of a data packet succeeds or fails, start a second timer in timers for controlling sidelink discontinuous reception; where monitoring on a physical sidelink control channel PSCCH or physical sidelink shared channel PSSCH is not performed during running of the first timer; and monitoring on the PSCCH or PSSCH is performed during running of the second timer.

Optionally, in a case that the SCI indicates HARQ enable and/or use of negative-positive acknowledgement, the determining module in this embodiment of this application may further include: a fifth starting unit, configured to: after HARQ feedback is sent to the second terminal, start a first timer in timers for controlling sidelink discontinuous reception, where the HARQ feedback is positive feedback ACK or negative feedback NACK; a sixth starting unit, configured to: in a case that the first timer expires, start a second timer in timers for controlling sidelink discontinuous reception; where monitoring for a PSCCH and/or PSSCH is not performed during running of the first timer; and monitoring for the PSCCH and/or PSSCH is performed during running of the second timer.

Optionally, in a case that the SCI indicates HARQ enable and/or use of negative-positive acknowledgement, the determining module 74 in this embodiment of this application may further include: a seventh starting unit, configured to: in a case that a duration of decoding a data packet exceeds a preset duration or decoding fails, start a second timer in timers for controlling sidelink discontinuous reception; where the preset duration includes at least one of the following: a running duration of a third timer, a duration specified by a protocol, and a duration configured by a network-side device; and during running of the second timer, monitoring for a PSCCH and/or PSSCH is performed.

Optionally, in a case that the SCI indicates HARQ enable and use of negative-only acknowledgement, the determining module 74 in this embodiment of this application may further include: a first processing unit, configured to: in a case that a distance from the second terminal is greater than or equal to a communication range requirement, determine not to send the HARQ feedback and not to start a first timer and a second timer in timers for controlling sidelink discontinuous reception; where monitoring for a PSCCH and/or PSSCH is not performed during running of the first timer; and monitoring for the PSCCH and/or PSSCH is performed during running of the second timer.

Optionally, in a case that the SCI indicates HARQ enable and use of negative-only acknowledgement, the determining module 74 in this embodiment of this application may further include: a second processing unit, configured to: in a case that a distance from the second terminal is greater than or equal to a communication range requirement, determine not to send the HARQ feedback, and start a first timer in timers for controlling sidelink discontinuous reception; and an eighth starting unit, configured to: in a case that the first timer expires, start a second timer in timers for controlling sidelink discontinuous reception; where monitoring for a PSCCH and/or PSSCH is not performed during running of the first timer; and monitoring for the PSCCH and/or PSSCH is performed during running of the second timer.

Optionally, in a case that the SCI indicates HARQ enable and use of negative-only acknowledgement, the determining module 74 in this embodiment of this application may further include: a third processing unit, configured to: in a case that a distance from the second terminal is greater than or equal to a communication range requirement, after decoding of a data packet succeeds or fails and a HARQ feedback being NACK is sent, or after decoding of a data packet succeeds or fails and it is determined not to send the HARQ feedback, start a first timer in timers for controlling sidelink discontinuous reception; and a ninth starting unit, configured to: in a case that the first timer expires and decoding of a data packet succeeds or fails, start a second timer in timers for controlling sidelink discontinuous reception; where monitoring for a PSCCH and/or PSSCH is not performed during running of the first timer; and monitoring for the PSCCH and/or PSSCH is performed during running of the second timer.

Optionally, in a case that the SCI indicates HARQ enable and use of negative-only acknowledgement, the determining module 74 in this embodiment of this application may further include: a tenth starting unit, configured to: in a case that a duration of decoding a data packet corresponding to a HARQ process exceeds a preset duration and decoding fails, start a second timer in timers for controlling sidelink discontinuous reception; where the preset duration includes at least one of the following: a running duration of a third timer, a duration specified by a protocol, and a duration configured by a network-side device; and during running of the second timer, monitoring for a PSCCH and/or PSSCH is performed.

Optionally, in a case that the SCI indicates HARQ enable and use of negative-only acknowledgement, the determining module 74 in this embodiment of this application may further include: a fourth processing unit, configured to: in a case that it is determined, based on the SCI, that a distance from the second terminal is less than a communication range requirement, determine to send the HARQ feedback; an eleventh starting unit, configured to: after the HARQ feedback is sent, start a first timer in timers for controlling sidelink discontinuous reception; and a twelfth starting unit, configured to: in a case that the first timer expires and decoding of a data packet fails, start a second timer in timers for controlling sidelink discontinuous reception; where monitoring for a PSCCH and/or PSSCH is not performed during running of the first timer; and monitoring for the PSCCH and/or PSSCH is performed during running of the second timer.

Optionally, the first operation in this embodiment of this application further includes: determining whether physical sidelink shared channel PSSCH transmission has been performed. Based on this, the determining module 74 in this embodiment of this application may further include: a thirteenth starting unit, configured to: in a case that it is determined that physical sidelink shared channel PSSCH transmission has been performed, start a timer for controlling sidelink discontinuous reception.

Optionally, a mode of the PSSCH transmission includes one of the following: performing transmission using a resource pool of a base station scheduling mode for resource allocation; and performing transmission using a configuration grant or dynamic grant of a terminal autonomous mode for resource allocation.

During sidelink-based transmission, based on a status of determining whether to send a hybrid automatic repeat request HARQ feedback status and a result of decoding a data packet, the apparatus in this embodiment of this application may determine whether to start a timer for controlling sidelink discontinuous reception. In this way, whether to start the timer for controlling sidelink discontinuous reception is controlled to implement control on sidelink discontinuous reception DRX, so as to resolve the prior-art problem that an existing DRX mechanism is applied to only uplink and downlink between a network-side device and a terminal, resulting in relatively simple application scenarios of DRX configurations.

The discontinuous reception control apparatus in this embodiment of this application may be an apparatus, or may be a component, an integrated circuit, or a chip in a terminal. The apparatus may be a mobile terminal or a non-mobile terminal. For example, the mobile terminal may include but is not limited to the types of the terminal 11 listed above, and the non-mobile terminal may be a server, a network attached storage (NAS), a personal computer (PC), a television (TV), a teller machine, a self-service machine, or the like, which is not specifically limited in this embodiment of this application.

The discontinuous reception control apparatus in this embodiment of this application may be an apparatus having an operating system. The operating system may be an Android operating system, an iOS operating system, or other possible operating systems, and is not specifically limited in the embodiments of this application.

The discontinuous reception control apparatus provided in this embodiment of this application is capable of implementing the processes implemented in the method embodiment in FIG. 6, with the same technical effects achieved. To avoid repetition, details are not described herein again.

Figure 8:
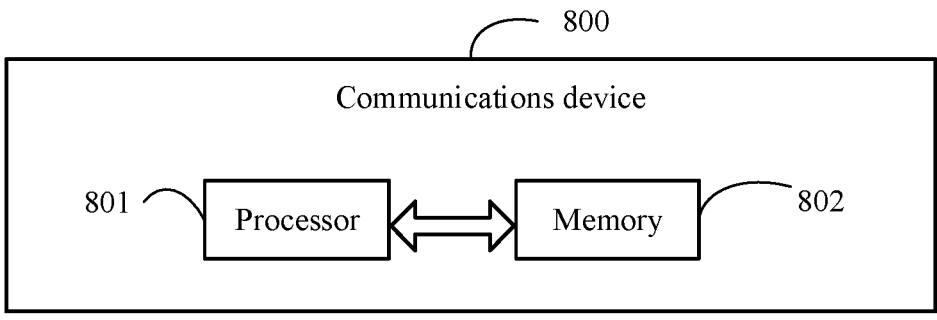
FIG. 8 is a schematic structural diagram of a communications device according to an embodiment of this application.

Optionally, as shown in FIG. 8, an embodiment of this application further provides a communications device 800, including a processor 801, a memory 802, and a program or instructions stored in the memory 802 and capable of running on the processor 801. For example, when the communications device 800 is a terminal and when the program or the instructions are executed by the processor 801, the processes of the foregoing embodiment of the discontinuous reception control method are implemented, with the same technical effects achieved. When the communications device 800 is a network-side device and when the program or the instructions are executed by the processor 801, the processes of the foregoing embodiment of the discontinuous reception control method are implemented, with the same technical effects achieved. To avoid repetition, details are not described herein again.

Figure 9:
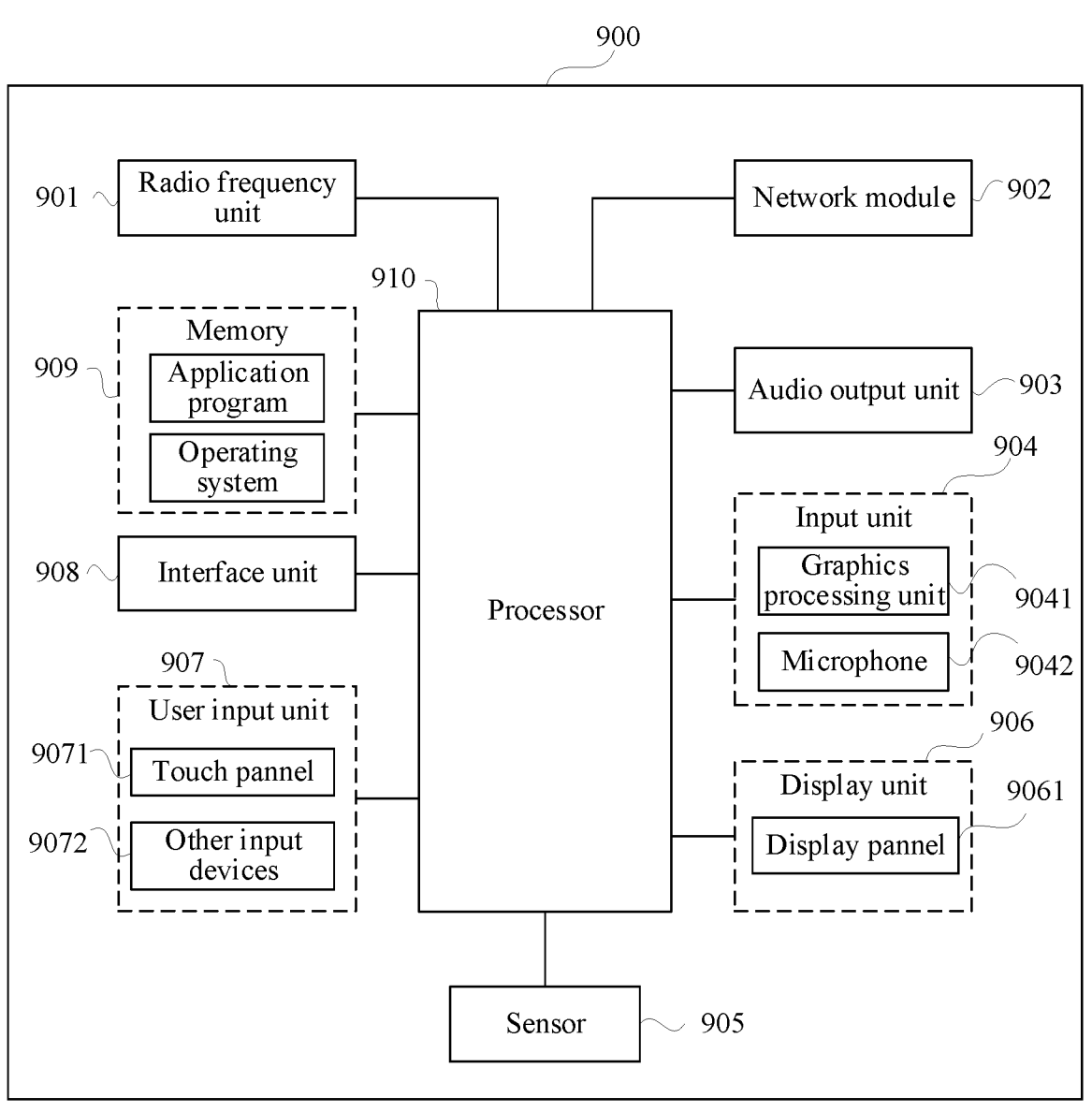
FIG. 9 is a schematic diagram of a hardware structure of a terminal for implementing the embodiments of this application.

FIG. 9 is a schematic diagram of a hardware structure of a terminal for implementing the embodiments of this application.

The terminal 900 includes but is not limited to components such as a radio frequency unit 901, a network module 902, an audio output unit 903, an input unit 904, a sensor 905, a display unit 906, a user input unit 907, an interface unit 908, a memory 909, and a processor 910.

Persons skilled in the art can understand that the terminal 900 may further include a power supply (for example, a battery) supplying power to the components, and the power supply may be logically connected to the processor 910 through a power management system. In this way, functions such as charge management, discharge management, and power consumption management are implemented by using the power management system. The structure of the terminal shown in FIG. 9 does not constitute any limitation on the terminal. The terminal may include more or fewer components than shown in FIG. 9, or a combination of some components, or the components disposed differently. Details are not described herein again.

It can be understood that in this embodiment of this application, the input unit 904 may include a graphics processing unit (GPU) 9041 and a microphone 9042. The graphics processing unit 9041 processes image data of a still picture or video obtained by an image capture apparatus (such as a camera) in a video capture mode or an image capture mode. The display unit 906 may include a display panel 9061, and the display panel 9061 may be configured in a form of a liquid crystal display, an organic light-emitting diode, and the like. The user input unit 907 may include a touch panel 9071 and other input devices 9072. The touch panel 9071 is also referred to as a touchscreen. The touch panel 9071 may include two parts: a touch detection apparatus and a touch controller. The other input devices 9072 may include but are not limited to a physical keyboard, a function key (such as a volume control key or a power on/off key), a trackball, a mouse, a joystick, and the like. Details are not described herein.

In this embodiment of this application, the radio frequency unit 901 receives downlink data from a network-side device, and then sends the downlink data to the processor 910 for processing; and also sends uplink data to the network-side device. Generally, the radio frequency unit 901 includes but is not limited to an antenna, at least one amplifier, a transceiver, a coupler, a low noise amplifier, a duplexer, and the like.

The memory 909 may be configured to store software programs or instructions and various data. The memory 909 may include a program or instruction storage area and a data storage area. The program or instruction storage area may store an operating system, an application program or instruction required by at least one function (for example, a sound playback function or an image playback function), and the like. In addition, the memory 909 may include a high-speed random access memory, and may further include a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory, for example, at least one disk storage device, a flash memory device, or another volatile solid-state storage device.

The processor 910 may include one or more processing units. Optionally, an application processor and a modem processor may be integrated in the processor 910. The application processor primarily processes an operating system, user interfaces, application programs or instructions, and the like. The modem processor primarily processes radio communication, for example, being a baseband processor. It can be understood that the modem processor may alternatively be not integrated in the processor 910.

The processor 910 is configured to perform a first operation during sidelink-based transmission, where the first operation includes at least one of the following: the terminal 900 determines a status of whether to send a hybrid automatic repeat request HARQ feedback, and the terminal 900 decodes a data packet; and determining, by the first terminal based on an execution result of the first operation, whether to start a timer for controlling sidelink discontinuous reception.

During sidelink-based transmission, based on a status of determining whether to send a hybrid automatic repeat request HARQ feedback status and a result of decoding a data packet, the terminal in this embodiment of this application may determine whether to start a timer for controlling sidelink discontinuous reception. In this way, whether to start the timer for controlling sidelink discontinuous reception is controlled to implement control on sidelink discontinuous reception DRX, so as to resolve the prior-art problem that an existing DRX mechanism is applied to only uplink and downlink between a network-side device and a terminal, resulting in relatively simple application scenarios of DRX configurations.

An embodiment of this application further provides a readable storage medium, where a program or instructions are stored in the readable storage medium. When the program or instructions are executed by a processor, the processes of the foregoing embodiment of the discontinuous reception control method can be implemented, with same technical effects achieved. To avoid repetition, details are not described herein again.

The processor is a processor in the terminal described in the foregoing embodiment. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communications interface. The communications interface is coupled to the processor, and the processor is configured to run a program or instructions of a network device to implement the processes of the foregoing embodiment of the discontinuous reception control method, with the same technical effects achieved. To avoid repetition, details are not described herein again.

It should be understood that the chip mentioned in this embodiment of this application may also be referred to as a system-on-chip, a system chip, a system-on-a-chip, or a system on a chip, or the like.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. Furthermore, it should be noted that, in the scope of the method and apparatus in the embodiments of this application, execution of the functions is not limited to the order shown or described, and the functions may alternatively be executed in a substantially simultaneous manner or in a reverse order. For example, the described method may be performed in an order different from that described, and steps may be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this application essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A discontinuous reception control method, comprising:

performing, by a first terminal, a first operation during sidelink-based transmission, wherein the first operation comprises at least one of the following: the first terminal determines a status of whether to send a hybrid automatic repeat request HARQ feedback, and the first terminal decodes a data packet; and determining, by the first terminal based on an execution result of the first operation, whether to start a timer for controlling sidelink discontinuous reception;

wherein before the performing, by a first terminal, a first operation, the method further comprises:

receiving, by the first terminal, sidelink control information SCI sent by a second terminal; wherein the SCI is used to indicate at least one of the following: HARQ feedback is enabled, a negative-only acknowledgement is used, and a negative-positive acknowledgement is used;

wherein in a case that the SCI indicates, to the first terminal, HARQ enable and use of the negative-positive acknowledgement information mode, the determining, by the first terminal based on an execution result of the first operation, whether to start a timer for controlling sidelink discontinuous reception comprises:

after the first terminal sends HARQ feedback to the second terminal, starting, by the first terminal, a first timer in timers for controlling sidelink discontinuous reception, wherein the HARQ feedback is positive feedback ACK or negative feedback NACK; and in a case that the first timer expires and decoding of a data packet by the first terminal succeeds, starting, by the first terminal, a second timer in timers for controlling sidelink discontinuous reception; wherein during running of the first timer, the first terminal does not monitor a physical sidelink control channel PSCCH and/or a physical sidelink shared channel PSSCH; and during running of the second timer, the first terminal monitors the PSCCH and/or the PSSCH.

2. The method according to claim 1, wherein in a case that the SCI indicates, to the first terminal, HARQ enable and/or use of the negative-positive acknowledgement information mode, the determining, by the first terminal based on an execution result of the first operation, whether to start a timer for controlling sidelink discontinuous reception comprises:

after the first terminal sends HARQ feedback to the second terminal, in a case that the HARQ feedback is NACK, starting, by the first terminal, a first timer in timers for controlling sidelink discontinuous reception, wherein the first terminal does not start the first timer in a case that the HARQ feedback is ACK; and in a case that the first timer expires and decoding of a data packet by the first terminal succeeds or fails, starting, by the first terminal, a second timer in timers for controlling sidelink discontinuous reception; wherein during running of the first timer, the first terminal does not monitor a PSCCH and/or a PSSCH; and during running of the second timer, the first terminal monitors the PSCCH and/or the PSSCH.

3. The method according to claim 1, wherein in a case that the SCI indicates, to the first terminal, HARQ enable and/or use of the negative-positive acknowledgement information mode, the determining, by the first terminal based on an execution result of the first operation, whether to start a timer for controlling sidelink discontinuous reception comprises:

after the first terminal sends HARQ feedback to the second terminal, starting, by the first terminal, a first timer in timers for controlling sidelink discontinuous reception, wherein the HARQ feedback is positive feedback ACK or negative feedback NACK; and in a case that the first timer expires, starting, by the first terminal, a second timer in timers for controlling sidelink discontinuous reception; wherein during running of the first timer, the first terminal does not monitor a PSCCH and/or a PSSCH; and during running of the second timer, the first terminal monitors the PSCCH and/or the PSSCH.

4. The method according to claim 1, wherein in a case that the SCI indicates, to the first terminal, HARQ enable and/or use of the negative-positive acknowledgement information mode, the determining, by the first terminal based on an execution result of the first operation, whether to start a timer for controlling sidelink discontinuous reception comprises:

in a case that a duration of decoding a data packet exceeds a preset duration or decoding fails, starting, by the first terminal, a second timer in timers for controlling sidelink discontinuous reception; wherein the preset duration comprises at least one of the following: a running duration of a third timer, a duration specified by a protocol, and a duration configured by a network-side device; and during running of the second timer, the first terminal monitors a PSCCH and/or PSSCH.

5. The method according to claim 1, wherein in a case that the SCI indicates, to the first terminal, HARQ enable and/or use of the negative-only acknowledgement information mode, the determining, by the first terminal based on an execution result of the first operation, whether to start a timer for controlling sidelink discontinuous reception comprises:

in a case that a distance between the first terminal and the second terminal is greater than or equal to a communication range requirement, determining, by the first terminal, not to send the HARQ feedback and not to start a first timer and a second timer in timers for controlling sidelink discontinuous reception; wherein during running of the first timer, the first terminal does not monitor a PSCCH and/or a PSSCH; and during running of the second timer, the first terminal monitors the PSCCH and/or the PSSCH.

6. The method according to claim 1, wherein in a case that the SCI indicates, to the first terminal, HARQ enable and/or use of the negative-only acknowledgement information mode, the determining, by the first terminal based on an execution result of the first operation, whether to start a timer for controlling sidelink discontinuous reception comprises:

in a case that a distance between the first terminal and the second terminal is greater than or equal to a communication range requirement, determining, by the first terminal, not to send the HARQ feedback, and starting a first timer in timers for controlling sidelink discontinuous reception; wherein in a case that the first timer expires, starting, by the first terminal, a second timer in timers for controlling sidelink discontinuous reception; wherein during running of the first timer, the first terminal does not monitor a PSCCH and/or a PSSCH; and during running of the second timer, the first terminal monitors the PSCCH and/or the PSSCH.

7. The method according to claim 1, wherein in a case that the SCI indicates, to the first terminal, HARQ enable and/or use of the negative-only acknowledgement information mode, the determining, by the first terminal based on an execution result of the first operation, whether to start a timer for controlling sidelink discontinuous reception comprises:

in a case that a distance between the first terminal and the second terminal is greater than or equal to a communication range requirement, after decoding of a data packet succeeds or fails and a HARQ feedback being NACK is sent, or after decoding of a data packet succeeds or fails and the first terminal determines not to send the HARQ feedback, starting, by the first terminal, a first timer in timers for controlling sidelink discontinuous reception; and in a case that the first timer expires and decoding of a data packet by the first terminal succeeds or fails, starting, by the first terminal, a second timer in timers for controlling sidelink discontinuous reception; wherein during running of the first timer, the first terminal does not monitor a PSCCH and/or a PSSCH; and during running of the second timer, the first terminal monitors the PSCCH and/or the PSSCH.

8. The method according to claim 1, wherein in a case that the SCI indicates, to the first terminal, HARQ enable and/or use of the negative-only acknowledgement information mode, the determining, by the first terminal based on an execution result of the first operation, whether to start a timer for controlling sidelink discontinuous reception comprises:

in a case that a duration of decoding a data packet corresponding to a HARQ process exceeds a preset duration and decoding fails, starting, by the first terminal, a second timer in timers for controlling sidelink discontinuous reception; wherein the preset duration comprises at least one of the following: a running duration of a third timer, a duration specified by a protocol, and a duration configured by a network-side device; and during running of the second timer, the first terminal monitors a PSCCH and/or PSSCH.

9. The method according to claim 1, wherein in a case that the SCI indicates, to the first terminal, HARQ enable and/or use of the negative-only acknowledgement information mode, the determining, by the first terminal based on an execution result of the first operation, whether to start a timer for controlling sidelink discontinuous reception comprises:

in a case that it is determined, based on the SCI, that a distance between the first terminal and the second terminal is less than a communication range requirement, determining, by the first terminal, to send the HARQ feedback;

after the HARQ feedback is sent, starting, by the first terminal, a first timer in timers for controlling sidelink discontinuous reception; and in a case that the first timer expires and decoding of a data packet by the first terminal fails, starting, by the first terminal, a second timer in timers for controlling sidelink discontinuous reception; wherein during running of the first timer, the first terminal does not monitor a PSCCH and/or a PSSCH; and during running of the second timer, the first terminal monitors the PSCCH and/or the PSSCH.

10. The method according to claim 1, wherein the first operation further comprises: the first terminal determines whether physical sidelink shared channel PSSCH transmission has been performed, and the determining, by the first terminal based on an execution result of the first operation, whether to start a timer for controlling sidelink discontinuous reception comprises:

in a case that the first terminal determines that physical sidelink shared channel PSSCH transmission has been performed, starting, by the first terminal, a timer for controlling sidelink discontinuous reception.

11. The method according to claim 10, wherein a mode of the PSSCH transmission comprises one of the following:

performing transmission using a resource pool of a base station scheduling mode for resource allocation; and performing transmission using a configuration grant or dynamic grant of a terminal autonomous mode for resource allocation.

12. A first terminal, comprising a processor, a memory, and a program or instructions stored in the memory and capable of running on the processor, wherein when the program or instructions are executed by the processor, the following steps of a discontinuous reception control method are implemented:

performing, by the first terminal, a first operation during sidelink-based transmission, wherein the first operation comprises at least one of the following: the first terminal determines a status of whether to send a hybrid automatic repeat request HARQ feedback, and the first terminal decodes a data packet; and determining, by the first terminal based on an execution result of the first operation, whether to start a timer for controlling sidelink discontinuous reception;

wherein before the performing, by the first terminal, a first operation, the method further comprises:

receiving, by the first terminal, sidelink control information SCI sent by a second terminal; wherein the SCI is used to indicate at least one of the following: HARQ feedback is enabled, a negative-only acknowledgement is used, and a negative-positive acknowledgement is used;

wherein in a case that the SCI indicates, to the first terminal, HARQ enable and use of the negative-positive acknowledgement information mode, the determining, by the first terminal based on an execution result of the first operation, whether to start a timer for controlling sidelink discontinuous reception comprises:

after the first terminal sends HARQ feedback to the second terminal, starting, by the first terminal, a first timer in timers for controlling sidelink discontinuous reception, wherein the HARQ feedback is positive feedback ACK or negative feedback NACK; and in a case that the first timer expires and decoding of a data packet by the first terminal succeeds, starting, by the first terminal, a second timer in timers for controlling sidelink discontinuous reception; wherein during running of the first timer, the first terminal does not monitor a physical sidelink control channel PSCCH and/or a physical sidelink shared channel PSSCH; and during running of the second timer, the first terminal monitors the PSCCH and/or the PSSCH.

13. The first terminal according to claim 12, wherein in a case that the SCI indicates, to the first terminal, HARQ enable and/or use of the negative-positive acknowledgement information mode, the determining, by the first terminal based on an execution result of the first operation, whether to start a timer for controlling sidelink discontinuous reception comprises:

after the first terminal sends HARQ feedback to the second terminal, in a case that the HARQ feedback is NACK, starting, by the first terminal, a first timer in timers for controlling sidelink discontinuous reception, wherein the first terminal does not start the first timer in a case that the HARQ feedback is ACK; and in a case that the first timer expires and decoding of a data packet by the first terminal succeeds or fails, starting, by the first terminal, a second timer in timers for controlling sidelink discontinuous reception; wherein during running of the first timer, the first terminal does not monitor a PSCCH and/or a PSSCH; and during running of the second timer, the first terminal monitors the PSCCH and/or the PSSCH;

or, wherein in a case that the SCI indicates, to the first terminal, HARQ enable and/or use of the negative-positive acknowledgement information mode, the determining, by the first terminal based on an execution result of the first operation, whether to start a timer for controlling sidelink discontinuous reception comprises:

after the first terminal sends HARQ feedback to the second terminal, starting, by the first terminal, a first timer in timers for controlling sidelink discontinuous reception, wherein the HARQ feedback is positive feedback ACK or negative feedback NACK; and in a case that the first timer expires, starting, by the first terminal, a second timer in timers for controlling sidelink discontinuous reception; wherein during running of the first timer, the first terminal does not monitor a PSCCH and/or a PSSCH; and during running of the second timer, the first terminal monitors the PSCCH and/or the PSSCH;

or, wherein in a case that the SCI indicates, to the first terminal, HARQ enable and/or use of the negative-positive acknowledgement information mode, the determining, by the first terminal based on an execution result of the first operation, whether to start a timer for controlling sidelink discontinuous reception comprises:

in a case that a duration of decoding a data packet exceeds a preset duration or decoding fails, starting, by the first terminal, a second timer in timers for controlling sidelink discontinuous reception; wherein the preset duration comprises at least one of the following: a running duration of a third timer, a duration specified by a protocol, and a duration configured by a network-side device; and during running of the second timer, the first terminal monitors a PSCCH and/or PSSCH.

14. The first terminal according to claim 12, wherein in a case that the SCI indicates, to the first terminal, HARQ enable and/or use of the negative-only acknowledgement information mode, the determining, by the first terminal based on an execution result of the first operation, whether to start a timer for controlling sidelink discontinuous reception comprises:

in a case that a distance between the first terminal and the second terminal is greater than or equal to a communication range requirement, determining, by the first terminal, not to send the HARQ feedback and not to start a first timer and a second timer in timers for controlling sidelink discontinuous reception; wherein during running of the first timer, the first terminal does not monitor a PSCCH and/or a PSSCH; and during running of the second timer, the first terminal monitors the PSCCH and/or the PSSCH;

or, wherein in a case that the SCI indicates, to the first terminal, HARQ enable and/or use of the negative-only acknowledgement information mode, the determining, by the first terminal based on an execution result of the first operation, whether to start a timer for controlling sidelink discontinuous reception comprises:

in a case that a distance between the first terminal and the second terminal is greater than or equal to a communication range requirement, determining, by the first terminal, not to send the HARQ feedback, and starting a first timer in timers for controlling sidelink discontinuous reception; wherein in a case that the first timer expires, starting, by the first terminal, a second timer in timers for controlling sidelink discontinuous reception; wherein during running of the first timer, the first terminal does not monitor a PSCCH and/or a PSSCH; and during running of the second timer, the first terminal monitors the PSCCH and/or the PSSCH;

or, wherein in a case that the SCI indicates, to the first terminal, HARQ enable and/or use of the negative-only acknowledgement information mode, the determining, by the first terminal based on an execution result of the first operation, whether to start a timer for controlling sidelink discontinuous reception comprises:

in a case that a distance between the first terminal and the second terminal is greater than or equal to a communication range requirement, after decoding of a data packet succeeds or fails and a HARQ feedback being NACK is sent, or after decoding of a data packet succeeds or fails and the first terminal determines not to send the HARQ feedback, starting, by the first terminal, a first timer in timers for controlling sidelink discontinuous reception; and in a case that the first timer expires and decoding of a data packet by the first terminal succeeds or fails, starting, by the first terminal, a second timer in timers for controlling sidelink discontinuous reception; wherein during running of the first timer, the first terminal does not monitor a PSCCH and/or a PSSCH; and during running of the second timer, the first terminal monitors the PSCCH and/or the PSSCH;

or, wherein in a case that the SCI indicates, to the first terminal, HARQ enable and/or use of the negative-only acknowledgement information mode, the determining, by the first terminal based on an execution result of the first operation, whether to start a timer for controlling sidelink discontinuous reception comprises:

in a case that a duration of decoding a data packet corresponding to a HARQ process exceeds a preset duration and decoding fails, starting, by the first terminal, a second timer in timers for controlling sidelink discontinuous reception; wherein the preset duration comprises at least one of the following: a running duration of a third timer, a duration specified by a protocol, and a duration configured by a network-side device; and during running of the second timer, the first terminal monitors a PSCCH and/or PSSCH;

or, wherein in a case that the SCI indicates, to the first terminal, HARQ enable and/or use of the negative-only acknowledgement information mode, the determining, by the first terminal based on an execution result of the first operation, whether to start a timer for controlling sidelink discontinuous reception comprises:

in a case that it is determined, based on the SCI, that a distance between the first terminal and the second terminal is less than a communication range requirement, determining, by the first terminal, to send the HARQ feedback;

after the HARQ feedback is sent, starting, by the first terminal, a first timer in timers for controlling sidelink discontinuous reception; and in a case that the first timer expires and decoding of a data packet by the first terminal fails, starting, by the first terminal, a second timer in timers for controlling sidelink discontinuous reception; wherein during running of the first timer, the first terminal does not monitor a PSCCH and/or a PSSCH; and during running of the second timer, the first terminal monitors the PSCCH and/or the PSSCH.

15. The first terminal according to claim 12, wherein the first operation further comprises: the first terminal determines whether physical sidelink shared channel PSSCH transmission has been performed, and the determining, by the first terminal based on an execution result of the first operation, whether to start a timer for controlling sidelink discontinuous reception comprises:

in a case that the first terminal determines that physical sidelink shared channel PSSCH transmission has been performed, starting, by the first terminal, a timer for controlling sidelink discontinuous reception.

16. The first terminal according to claim 15, wherein a mode of the PSSCH transmission comprises one of the following:

performing transmission using a resource pool of a base station scheduling mode for resource allocation; and performing transmission using a configuration grant or dynamic grant of a terminal autonomous mode for resource allocation.

17. A non-transitory readable storage medium, wherein the non-transitory readable storage medium stores a program or instructions, and when the program or the instructions are executed by a processor, the following steps of a discontinuous reception control method are implemented:

performing a first operation during sidelink-based transmission, wherein the first operation comprises at least one of the following: a first terminal determines a status of whether to send a hybrid automatic repeat request HARQ feedback, and the first terminal decodes a data packet; and determining, based on an execution result of the first operation, whether to start a timer for controlling sidelink discontinuous reception;

wherein before the performing a first operation during sidelink-based transmission, the method further comprises:

receiving, by the first terminal, sidelink control information SCI sent by a second terminal; wherein the SCI is used to indicate at least one of the following:

HARQ feedback is enabled, a negative-only acknowledgement is used, and a negative-positive acknowledgement is used;

wherein in a case that the SCI indicates, to the first terminal, HARQ enable and use of the negative-positive acknowledgement information mode, the determining, by the first terminal based on an execution result of the first operation, whether to start a timer for controlling sidelink discontinuous reception comprises:

after the first terminal sends HARQ feedback to the second terminal, starting, by the first terminal, a first timer in timers for controlling sidelink discontinuous reception, wherein the HARQ feedback is positive feedback ACK or negative feedback NACK; and in a case that the first timer expires and decoding of a data packet by the first terminal succeeds, starting, by the first terminal, a second timer in timers for controlling sidelink discontinuous reception; wherein during running of the first timer, the first terminal does not monitor a physical sidelink control channel PSCCH and/or a physical sidelink shared channel PSSCH; and during running of the second timer, the first terminal monitors the PSCCH and/or the PSSCH.

* * * * *